United States Patent
Moon et al.

(10) Patent No.: US 12,149,006 B2
(45) Date of Patent: Nov. 19, 2024

(54) FREQUENCY-DIVISION DUPLEXING (FDD) TYPE ANTENNA DEVICE FOR IMPLEMENTING SPATIAL-POLARIZATION SEPARATION OF BEAMS USING QUAD-POLARIZED ANTENNA MODULE ARRAY

(71) Applicant: KMW INC., Hwaseong-si (KR)

(72) Inventors: Young Chan Moon, Suwon-si (KR); Sung Hwan So, Hwaseong-si (KR); Oh Seog Choi, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 155 days.

(21) Appl. No.: 17/865,338

(22) Filed: Jul. 14, 2022

(65) Prior Publication Data

US 2022/0359985 A1 Nov. 10, 2022

Related U.S. Application Data

(63) Continuation of application No. PCT/KR2021/000623, filed on Jan. 15, 2021.

(30) Foreign Application Priority Data

Jan. 17, 2020 (KR) .................. 10-2020-0006676
Apr. 28, 2020 (KR) .................. 10-2020-0051182

(51) Int. Cl.
*H01Q 5/28* (2015.01)
*H01Q 21/24* (2006.01)
*H04B 1/00* (2006.01)

(52) U.S. Cl.
CPC .............. *H01Q 5/28* (2015.01); *H01Q 21/24* (2013.01); *H04B 1/0057* (2013.01)

(58) Field of Classification Search
USPC ........................................................ 343/702
See application file for complete search history.

(56) References Cited

U.S. PATENT DOCUMENTS

2014/0106688 A1* 4/2014 Negus ................ H04B 1/54
455/90.2
2015/0222025 A1 8/2015 Song et al.
(Continued)

FOREIGN PATENT DOCUMENTS

JP 2011-120156 A 6/2011
JP 2015-529991 A 10/2015
(Continued)

OTHER PUBLICATIONS

Non-final office action mailed Apr. 22, 2021 for Korean Application No. 10-2020-0051182 and its English translation.
(Continued)

*Primary Examiner* — Dimary S Lopez Cruz
*Assistant Examiner* — Brandon Sean Woods
(74) *Attorney, Agent, or Firm* — Insight Law Group, PLLC; Seung Lee

(57) ABSTRACT

Disclosed is a frequency-division duplexing (FDD) type antenna device for implementing spatial-polarization separation of beams using a quad-polarized antenna module array.

There is provided an antenna device including first radiating elements, second radiating elements, third radiating elements, and fourth radiating elements, a filter unit including first, second, third, and fourth filters that filter signals of first, second, third, and fourth signal paths, respectively, and a phase setting module configured to set phases of the filtered signals so that a first beam and a second beam radiated through the first and second radiating elements and the third and fourth radiating elements, respectively, are separated in (Continued)

space, wherein the first beam and the second beam have different polarization directions.

7 Claims, 13 Drawing Sheets

(56) References Cited

U.S. PATENT DOCUMENTS

| | | |
|---|---|---|
| 2015/0303589 A1* | 10/2015 | Bi .......................... H01Q 21/24 343/893 |
| 2016/0111785 A1* | 4/2016 | Park ........................ H01Q 3/30 343/858 |
| 2019/0020124 A1 | 1/2019 | Song et al. |

FOREIGN PATENT DOCUMENTS

| | | | |
|---|---|---|---|
| JP | 2017118455 A | * | 6/2017 |
| JP | 6589101 B2 | | 10/2019 |
| KR | 10-2014-0140229 A | | 12/2014 |
| KR | 10-1847133 B1 | | 4/2018 |
| WO | 2018/061903 A1 | | 4/2018 |

OTHER PUBLICATIONS

International Search Report mailed Apr. 28, 2021 for International Application No. PCT/KR2021/000623 and its English translation.
Non-final Office Action mailed Aug. 15, 2023 from the Japanese Patent Office for Japanese Application No. 2022-543097 and its English translation.
Extended European Search Report mailed Jan. 23, 2024 from the European Patent Office for European Application No. 21740773.3.

* cited by examiner

FREQUENCY-DIVISION DUPLEXING (FDD) TYPE ANTENNA DEVICE FOR IMPLEMENTING SPATIAL-POLARIZATION SEPARATION OF BEAMS USING QUAD-POLARIZED ANTENNA MODULE ARRAY

CROSS-REFERENCE TO RELATED APPLICATIONS

This application is a continuation application of International Application No. PCT/KR2021/000623, filed Jan. 15, 2021, which claims priority to Korean Patent Application Nos. 10-2020-0006676, filed Jan. 17, 2020; and 10-2020-0051182, filed Apr. 28, 2020, in the Korean Intellectual Property Office, the disclosures of which are incorporated herein by reference in their entirety.

TECHNICAL FIELD

The present disclosure relates to a quad-polarized antenna module used for frequency-division duplexing and an antenna device for spatially separating a beam-pattern using the same.

BACKGROUND

The contents described in this section merely provide background information for the present disclosure and do not constitute the related art.

A frequency division duplexing (FDD) method and a time division duplexing (TDD) method has been used as a method of sharing transmitted/received signals together using a single transmission line or antenna.

The FDD type antenna is generally designed as a dual-polarized antenna module in order to reduce the effect of multipath fading and to perform a polarization diversity function. In addition, the FDD type antenna may have a form in which a plurality of dual-polarized antenna modules are arrayed and each of the dual-polarized antenna modules may include a plurality of antenna elements (radiation elements).

An example of an FDD type dual-polarized antenna module array is illustrated in FIG. 1. In FIG. 1, each arrow represents a radiating element, and the direction of the arrow represents a polarization direction of each radiating element. Among the radiating elements included in each of the dual-polarized antenna module (first antenna module) on a left side and the dual-polarized antenna module (second antenna module) on a right side, one of the radiating elements is arranged at an angle of +45°, and the other thereof may be arranged at an angle of −45°. That is, the radiating elements may have polarization directions that are orthogonal to or perpendicular to each other.

A 2T2R first antenna module may implement the FDD scheme by separating each of transmitted/received signals Tx1, Rx1, Tx2, and Rx2 using a diplexer (a first diplexer and a second diplexer). By additionally configuring a second antenna module and a third diplexer and a fourth diplexer (not illustrated) that separate and process the transmitted/received signals of the second antenna module, respectively, it is possible to implement 2T2R or higher transmission/reception signal processing.

However, in order to secure the isolation between the first antenna module and the second antenna module and to achieve optimal conditions for beamforming, the first antenna module and the second antenna module need to be arranged at a preset center-to-center distance (d, for example, for example, $0.5\lambda$). Since the first antenna module and the second antenna module need to be arranged in a state in which the preset center-to-center distance is secured within a limited space, it is difficult to additionally arrange the third diplexer and the fourth diplexer for the second antenna module.

When a size of the diplexer itself increases, the problem of insufficient space for additional arrangement of the third diplexer and the fourth diplexer may be further exacerbated. For example, as illustrated in FIG. 2, in the case of the FDD scheme, there may be a section (w) in which a distance between a transmission frequency (f2) band (PCS Tx) and a reception frequency (f1) band (PCS Rx) used for personal communications service (PCS) communication is very narrow. In this case, since the diplexer needs to be configured to include a larger number of resonators in order to secure a skirt characteristic at w, the size of the diplexer increases, and thus, the problem of lack of space for further arrangement of diplexers may be further exacerbated.

Meanwhile, the beam-forming (beam-pattern) through the dual-polarized antenna module array illustrated in FIG. 1 is illustrated in FIG. 3. A beam radiated by the first antenna module is represented by a dotted line waveform, and a beam radiated by the second antenna module is represented by a two-dot chain line waveform.

As can be seen from FIG. 3, the beams radiated from the dual-polarized antenna module array have a wide beam shape, and the wide beam type beam has a low signal to noise ratio (SNR) due to the surrounding environment, and thus there is difficulty in transmitting a signal to a distant point.

A conventional method is to solve these problems by coupling the radiating elements in the dual-polarized antenna module array (by sharing signal paths) and separating a space (sector) for a signal of the same frequency (a signal of the same polarization). For example, according to the conventional method, the signal of the same frequency is separated into three (FIG. 4A) or six (FIG. 4B) spaces and beam-formed. However, the conventional method may cause a problem in that since beams having the same polarization are arranged at adjacent locations, a correlation between the beams increases, and thus, communication quality deteriorates.

SUMMARY

Technical Problem

An object of an embodiment of the present disclosure is to reduce a size of an antenna module itself by changing a structure of the antenna module to secure a sufficient space for arrangement of a diplexer or a filter.

In addition, an object of another embodiment of the present disclosure is to provide an antenna device capable of improving communication quality by spatially separating beams radiated through an antenna module array and setting polarizations between beams radiated from adjacent locations to be different from each other to reduce a correlation between the beams.

Technical Solution

According to an embodiment of the present disclosure, there is provided a frequency division duplexing (FDD) type antenna device for implementing spatial-polarization separation of beams, the frequency division duplexing (FDD) type antenna device including: a quad-polarized antenna module array including first radiating elements that have the same polarization direction and share a first signal path, second radiating elements that have a polarization direction orthogonal to the first radiating elements and share a second signal path, third radiating elements that have a difference in polarization direction of 45° with respect to the second radiating elements and share a third signal path, and fourth radiating elements that have a polarization direction orthogonal to the third radiating elements and share a fourth signal path; a filter unit including a first filter that filters a signal of the first signal path, a second filter that filters a signal of the second signal path, a third filter that filters a signal of the third signal path, and a fourth filter that filters a signal of the fourth signal path; and a phase setting module configured to set phases of the filtered signals so that a first beam radiated through the first radiating elements and the second radiating elements and a second beam radiated through the third radiating elements and the fourth radiating elements are separated in space, wherein the first beam and the second beam have different polarization directions.

Advantageous Effects

As described above, according to the present disclosure, by coupling signal paths of radiating elements and connecting a filter to each of the coupled signal paths, it is possible to solve the problem of insufficient space for additional arrangement of the conventional diplexer.

In addition, according to the present disclosure, since physically separated dual-polarized antenna modules are unified into one quad-polarized antenna module, it is possible to reduce an area as well as provide convenience in manufacturing, installation, maintenance, and the like.

Moreover, according to the present disclosure, a narrow beam can be radiated, and as a result, a gain of an antenna may be improved, beams can be separated in various directions in space, and as a result, coverage can be expanded, and a correlation between the beams can be reduced by polarization separation of beams, and as a result, communication quality can be further improved.

DETAILED DESCRIPTION

Figure 1:
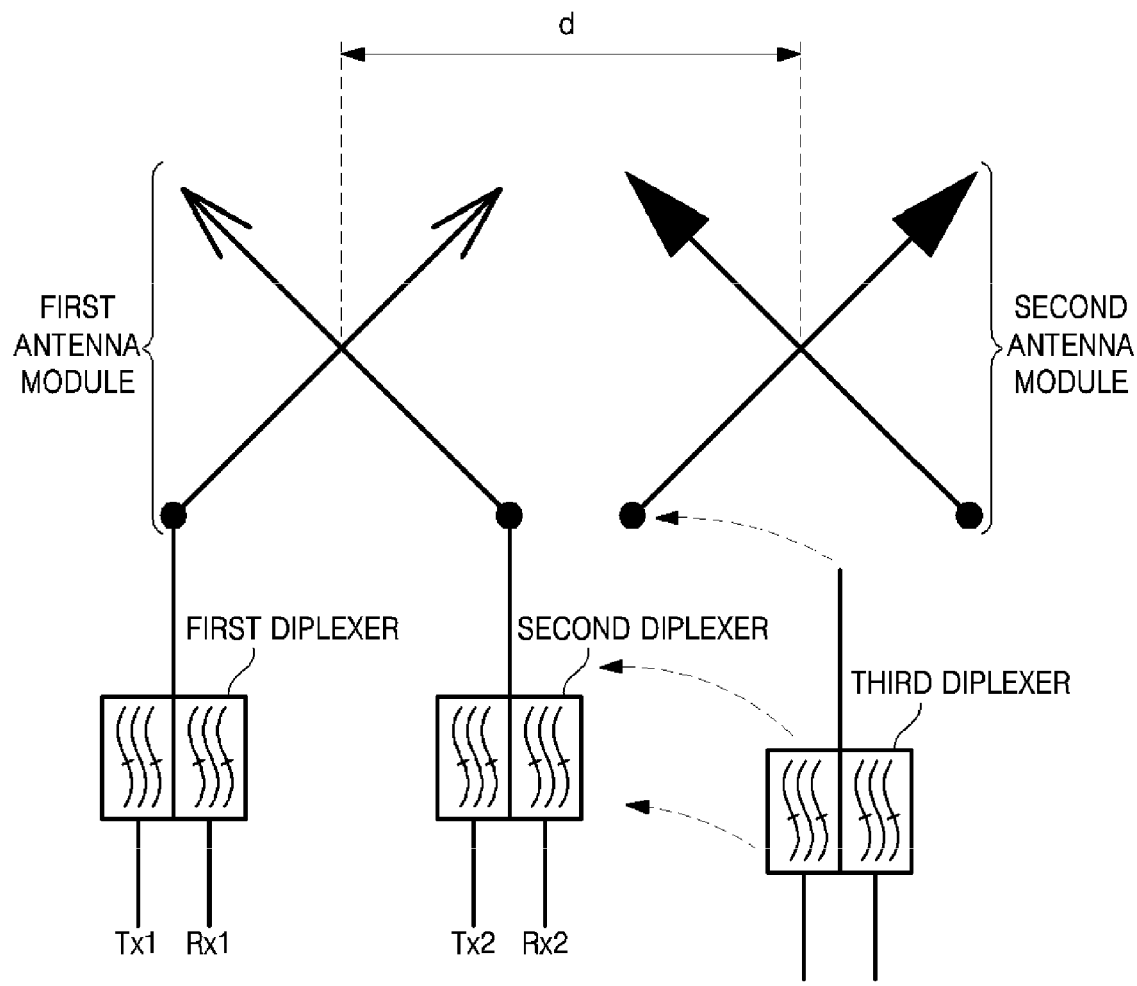
FIGS. 1 and 2 are diagrams for describing a conventional dual-polarized antenna device.
Figure 2:
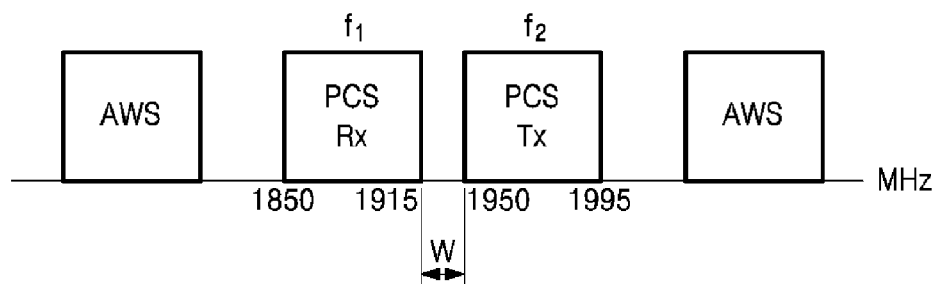
Figure 3:
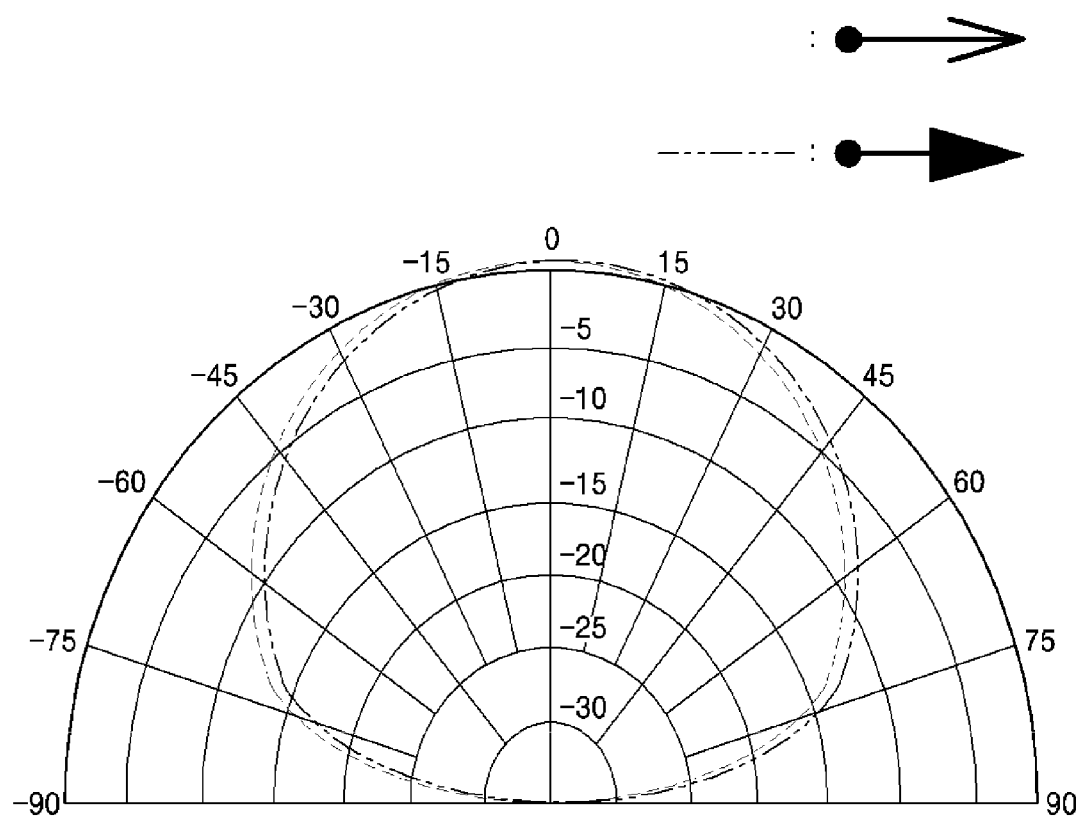
FIGS. 3, 4A and 4B are diagrams for describing beams radiated through the conventional dual-polarized antenna device.
Figure 4A:
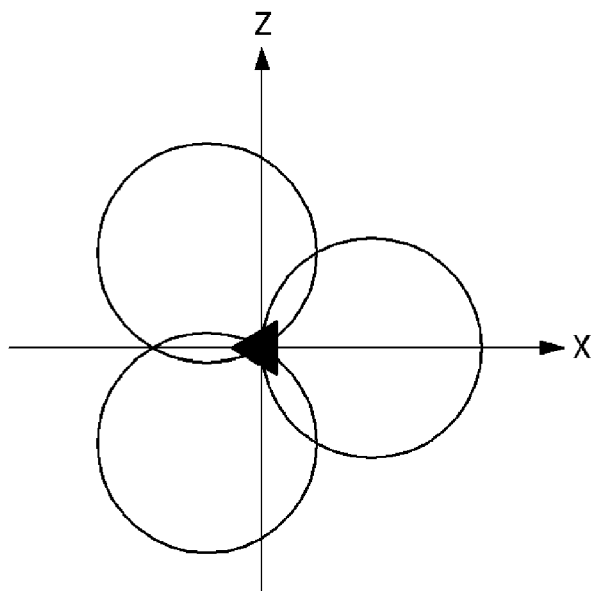
Figure 4B:
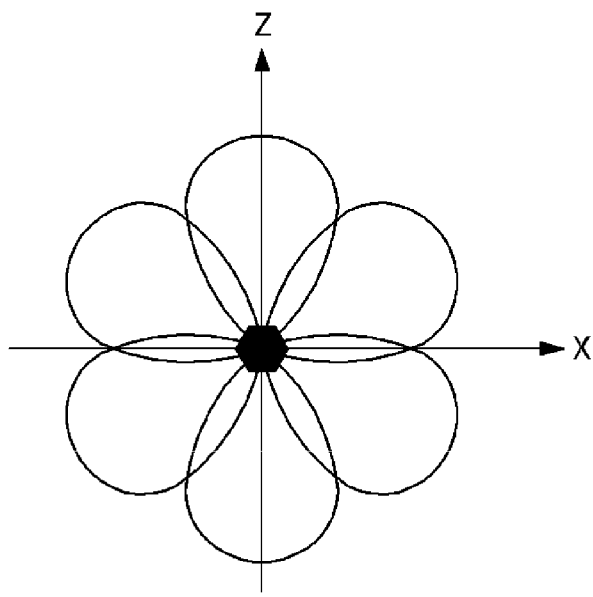

Hereinafter, exemplary embodiments of the present disclosure will be described in detail with reference to the accompanying drawings. It is to be noted that in giving reference numerals to components of the accompanying drawings, the same components will be denoted by the same reference numerals even though they are illustrated in different drawings. Further, in describing exemplary embodiments of the present disclosure, well-known functions or configurations will not be described in detail since they may unnecessarily obscure the understanding of the present disclosure.

In addition, terms first, second, A, B, (a), (b), and the like, will be used in describing components of exemplary embodiments of the present disclosure. These terms are used only in order to distinguish any component from other components, and features, sequences, or the like, of corresponding components are not limited by these terms. Throughout the present specification, unless explicitly described to the contrary, "including" and "comprising" any components will be understood to imply the inclusion of other elements rather than the exclusion of any other elements. A term "unit," "module," or the like, described in the specification means a unit of processing at least one function or operation and may be implemented by hardware or software or a combination of hardware and software.

In the present specification, 1) an antenna module capable of improving spatial efficiency, 2) a structure of an antenna module for securing a space in which additional filters can be arranged, and 3) an antenna device capable of implementing spatial-polarization separation of beams are proposed.

First Embodiment

In a first embodiment, a quadruple (quad)-polarized antenna module 500 capable of improving space efficiency is proposed.

Figure 6A:
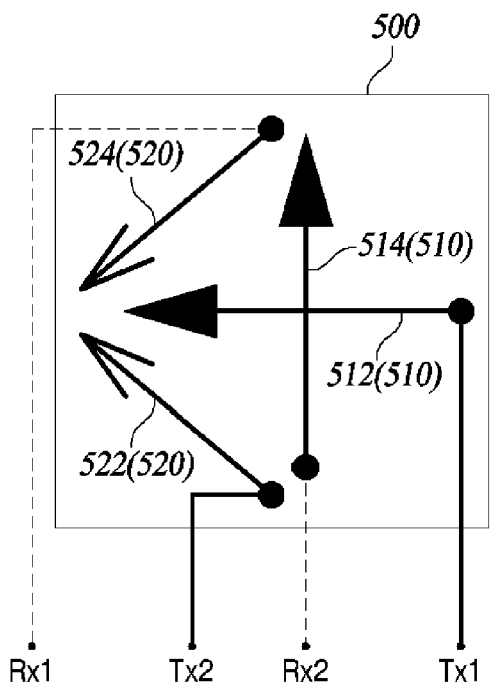
Figure 6C:
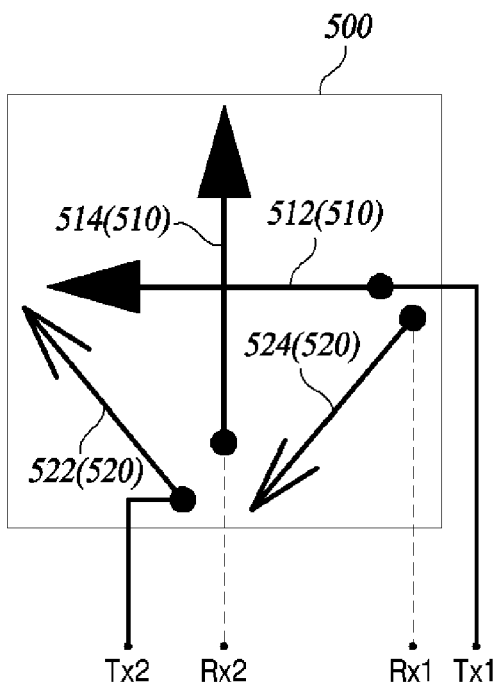
Figure 6B:
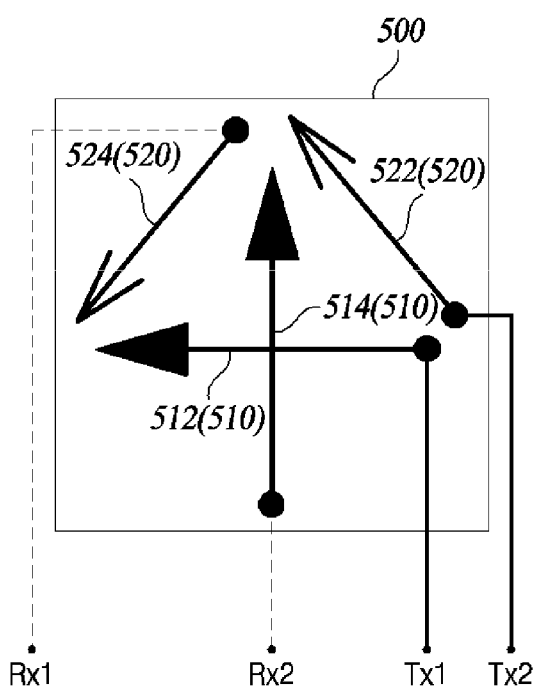
Figure 6D:
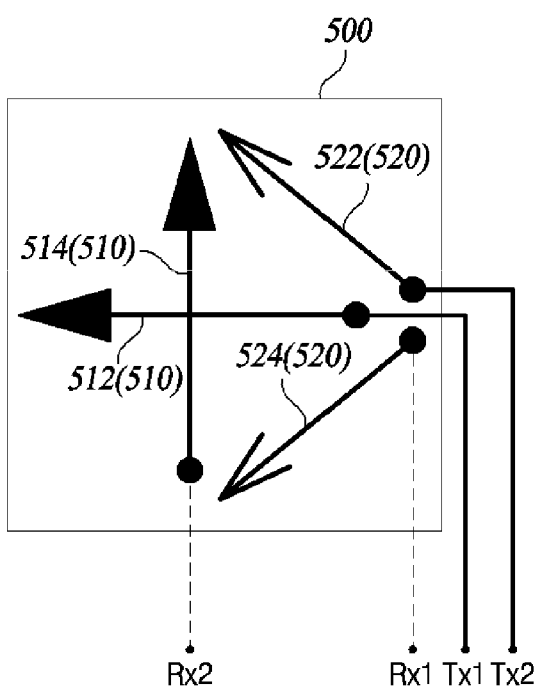
Figure 7:
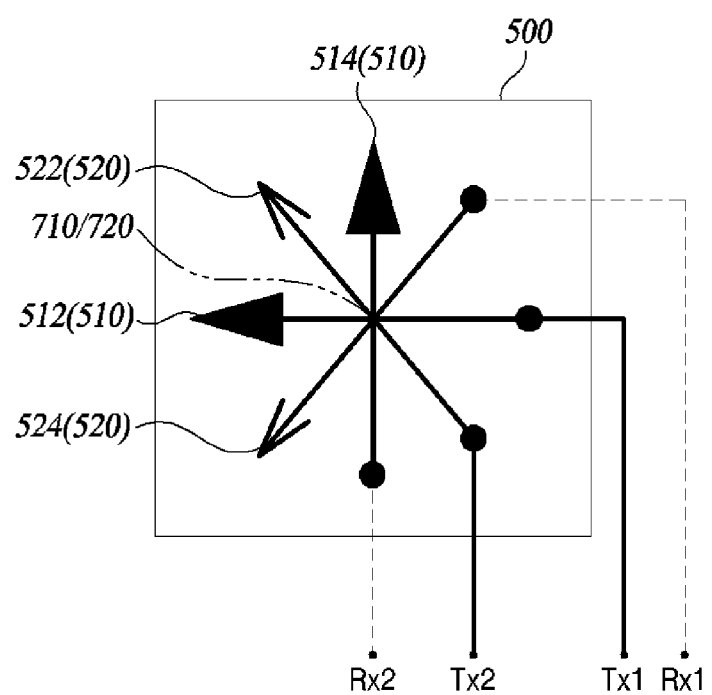

As illustrated in FIGS. 5 to 7, the quad-polarized antenna module 500 may be configured to include a first radiating element module 510 and a second radiating element module 520.

The first radiating element module 510 may be configured to include two radiating elements 512 and 514 having polarization directions orthogonal or perpendicular to each other. A second radiating element module 520 may also be configured to include two radiating elements 522 and 524 having polarization directions orthogonal or perpendicular to each other.

Here, the "orthogonal" or "perpendicular" may include both a case in which polarization directions of the radiating elements have an angle difference of exactly 90° and a case in which the polarization directions of the radiating elements have an angle difference of 90±θ. θ may vary depending on an error in a manufacturing process of the antenna module, a degree of correlation with other antenna modules, the need to adjust the beamforming direction, and the like.

One of the two radiating elements 512 and 514 included in the first radiating element module 510 is referred to as the first radiating element 512, and the other is referred to as the second radiating element 514. The second radiating element 514 may be set to have a polarization direction orthogonal or perpendicular to the polarization direction of the first radiating element 512.

One of the two radiating elements 522 and 524 included in the second radiating element module 520 is referred to as the third radiating element 522, and the other is referred to as the fourth radiating element 524. The third radiating element 522 may be set to have a difference in polarization direction of 45° with respect to the polarization direction of the first radiating element 512.

The fourth radiating element 524 may be set to have a polarization direction orthogonal or perpendicular to the polarization direction of the third radiating element 522. The second radiating element 514 has a polarization direction relationship of being orthogonal or perpendicular to the first radiating element 512, and the first radiating element 512 has a polarization direction relationship of 45° with respect to the third radiating element 522, and the fourth radiating element 524 has a polarization direction relationship of being orthogonal or perpendicular to the third radiating element 522. Accordingly, the fourth radiating element 524 has a polarization direction relationship of 45° with respect to the first radiating element 512 and the second radiating element 514.

Here, the "polarization direction relationship of 45°" may include both the case in which the radiating elements have a difference in polarization direction of exactly 45° and the case in which the radiating elements have a difference in polarization direction of 45°±θ. θ may vary depending on the error in the manufacturing process of the antenna module, the degree of correlation with other antenna modules, the need to adjust the beamforming direction, and the like.

According to the embodiment, the polarization direction of the radiating elements 512, 514, 522, and 524 may vary. For example, each of the first radiating element 512 and the second radiating element 514 may have polarization directions of +45° and −45°, and each of the third radiating element 522 and the fourth radiating element 524 may have vertical and horizontal polarizations. As another example, each of the first radiating element 512 and the second radiating element 514 may have vertical and horizontal polarization directions, and each of the third radiating element 522 and the fourth radiating element 524 may have polarization directions of +45° and −45°.

For the implementation of the FDD scheme, each of the radiating elements 512, 514, 522, and 524 may be used to transmit and receive a signal. For example, among the first radiating element 512 and the second radiating element 514, one (first radiating element) may be connected to the transmission line Tx1 and used to transmit a signal, and the other (second radiating element) may be connected to the reception line Rx2 and used to receive a signal. In addition, among the third radiating element 522 and the fourth radiating element 524, one (third radiating element) may be connected to the transmission line Tx2 and used to transmit a signal, and the other (fourth radiating element) may be connected to the reception line Rx1 and used to receive a signal.

Hereinafter, embodiments capable of improving the area efficiency of the quad-polarized antenna module 500 will be described. In the following embodiments, it is assumed that the first radiating element 512 and the third radiating element 522 are used to transmit a signal, and the second radiating element 514 and the fourth radiating element 524 are used to receive a signal.

Embodiment 1-1

Embodiment 1-1 is an embodiment in which a first radiating element 512 and a second radiating element 514 are arranged around a second radiating element module 520.

Figure 5A:
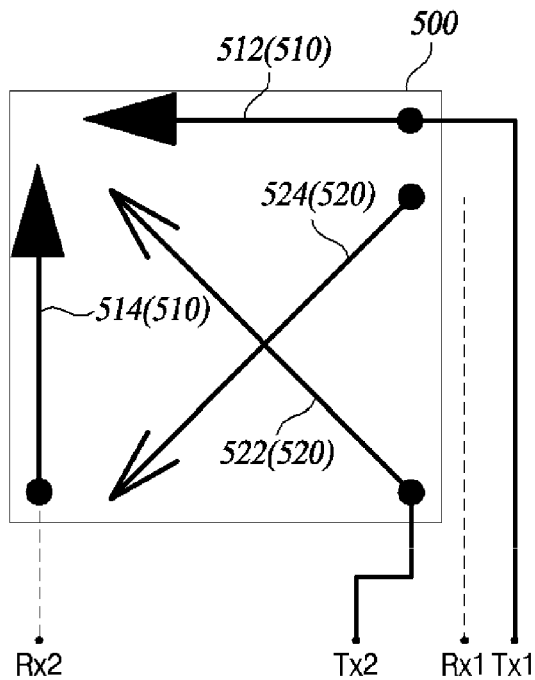
FIGS. 5A, 5B, 5C, 5D, 6A, 6B, 6C, 6D and 7 are diagrams for describing various examples of a quad-polarized antenna module.
Figure 5C:
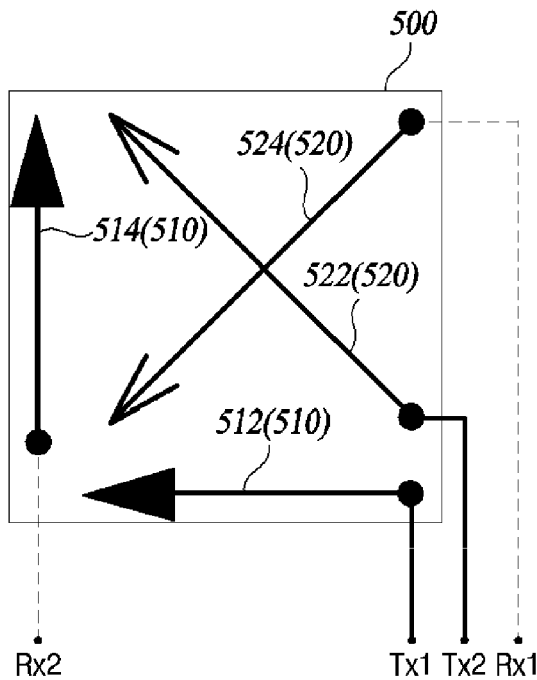
Figure 5B:
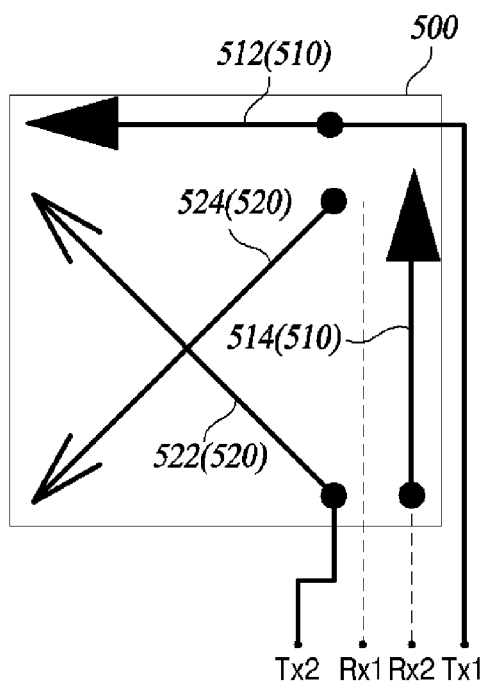
Figure 5D:
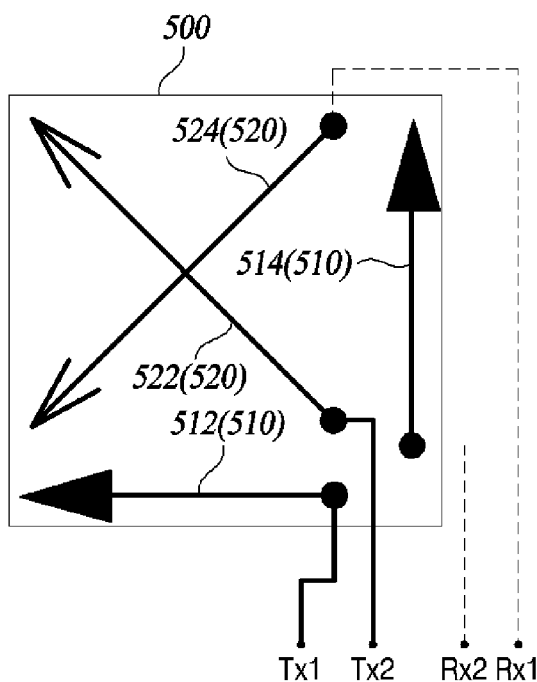

As illustrated in FIG. 5, the first radiating element 512 may be arranged on an upper side (around an upper side) of the second radiating element module 520 (see FIGS. 5A and 5B), or arranged on a lower side (around a lower side) of the second radiating element module 520 (see FIGS. 5C and 5D). The first radiating element 512 arranged on the upper side or the lower side of the second radiating element module 520 may have a difference in polarization direction of ±45° with respect to the third radiating element 522 and the fourth radiating element 524.

The second radiating element 514 may be arranged on a left side (around a left side) of the second radiating element module 520 (see FIGS. 5A and 5C), or arranged on a right side (around a right side) of the second radiating element module 520 (see FIGS. 5B and 5D). The second radiating element 514 arranged on the left side or the right side of the second radiating element module 520 may have a polarization direction which is orthogonal or perpendicular to the first radiating element 512, and have a difference in polarization direction of ±45° with respect to the third radiating element 522 and the fourth radiating element 524.

Embodiment 1-2

Embodiment 1-2 is an embodiment in which a third radiating element 522 and a fourth radiating element 524 are arranged around a first radiating element module 510.

As illustrated in FIG. 6, the third radiating element 522 may be arranged on a lower left side (around a lower left side) of the first radiating element module 510 (see FIGS. 6A and 6C), or arranged on an upper right side (around an upper right side) of the first radiating element module 510 (see FIGS. 6B and 6D). The third radiating element 522 arranged on the lower left side or the upper right side of the second radiating element module 520 may have a difference in polarization direction of ±45° with respect to the first radiating element 512 and the second radiating element 514.

The fourth radiating element 524 may be arranged on an upper left side (around an upper left side) of the first radiating element module 510 (see FIGS. 6A and 6B), or arranged on a lower right side (around a lower right side) of the first radiating element module 510 (see FIGS. 6C and 6D). The fourth radiating element 524 arranged on the upper left side or the lower right side of the second radiating element module 524 may have a polarization direction which is orthogonal or perpendicular to the third radiating element 522, and have a polarization direction of ±45° with respect to the first radiating element 512 and the second radiating element 514.

As described in Embodiments 1-1 and 1-2, in the quad-polarized antenna module 500 of the present disclosure, the first radiating element 512 and the second radiating element 514 may be included to be arranged in a region (solid line box in FIG. 5) occupied by the second radiating element module 520 or the third radiating element 522 and the fourth radiating element 524 may be configured to be arranged in a region (solid line box in FIG. 6) occupied by the first radiating element module 510.

Therefore, according to Embodiments 1-1 and 1-2, more improved area efficiency may be provided compared to the conventional antenna module in which the two radiating element modules are physically separated and arranged. In addition, the improvement in area efficiency may lead to convenience in manufacturing, installation, maintenance, and the like.

In Embodiment 1-1, the third radiating element 522 and the fourth radiating element 524 may be arranged in various forms. For example, the third radiating element 522 and the fourth radiating element 524 may be arranged to intersect with each other. In addition, centers of each of the third radiating element 522 and the fourth radiating element 524 may be arranged to coincide with each other. In this case, the area of the region (solid line box in FIG. 5) occupied by the second radiating element module 520 is minimized, and thus, area efficiency may be further increased.

In Embodiment 1-2, the first radiating element 512 and the second radiating element 514 may be arranged in various forms. For example, the first radiating element 512 and the second radiating element 514 may be arranged to intersect with each other. In addition, centers of each of the first radiating element 512 and the second radiating element 514 may be arranged to coincide with each other. In this case, the area of the region (solid line box in FIG. 6) occupied by the first radiating element module 510 is minimized, and thus, area efficiency may be further increased.

Embodiment 1-3

Embodiment 1-3 is an embodiment in which a first radiating element 512 and a second radiating element 514 are arranged to intersect with each other, and a third radiating element 522 and a fourth radiating element 524 are also arranged to intersect with each other.

As illustrated in FIG. 7, the first radiating element 512 and the second radiating element 514 may be arranged to intersect with each other. A location or point at which the first radiating element 512 and the second radiating element 514 intersect with each other is referred to as a "first intersection point 710."

As illustrated in FIG. 7, the third radiating element 522 and the fourth radiating element 524 may be arranged to intersect with each other. A location or point at which the third radiating element 522 and the fourth radiating element 524 intersect with each other is referred to as a "second intersection point 720."

An area (solid line box in FIG. 7) occupied by the quad-polarized antenna module 500 may be determined according to a distance between the first intersection point 710 and the second intersection point 720. As the distance between the first intersection point 710 and the second intersection point 720 increases, the area occupied by the quad-polarized antenna module 500 may increase, and as the distance between the first intersection point 710 and the second intersection point 720 decreases, the area occupied by the quad polarization antenna module 500 may decrease.

In order to provide more improved area efficiency compared to the conventional method (the two radiating element modules are physically separated), the distance between the first intersection point 710 and the second intersection point 720 is less than or equal to a length of one radiating element.

The distance between the first intersection point 710 and the second intersection point 720 may be variously set according to a designer's intention or an arrangement relationship with other antenna modules constituting the antenna module array, as long as it is less than or equal to the length of on radiating element.

In order to maximize area efficiency, the first intersection point 710 and the second intersection point 720 may be arranged at the same location. That is, the area efficiency may be maximized in arrangement in which the first radiating element 512 and the second radiating element 514 are arranged so that the centers of each of the first radiating element 512 and the second radiating element 522 coincide with each other (at the first intersection point), the third radiating element 522 and the fourth radiating element 524 are also arranged so that the centers of each of the third radiating element 522 and the fourth radiating element 524 coincide with each other (at the second intersection point), and the first intersection point 720 and the second intersection point 720 are arranged at the same location.

Second Embodiment

A second embodiment is directed to an antenna device capable of securing or reserving a sufficient space for additionally arranging filters and implementing spatial-polarization separation.

As described above, since beams radiated from the conventional dual-polarized antenna module array appear in the shape of a wide beam having a low antenna gain, it is difficult to for a signal to reach a long distance. When the antenna modules are arranged in an array form and signal paths of the radiating elements are coupled, the shape of a narrow beam may be formed and signal can be reach a long distance, but the following problems may occur.
1) In order to secure the isolation between the antenna modules and to achieve the optimal conditions for the beamforming, the antenna modules need to be arranged to have the preset center-to-center distance, but it is difficult to secure a sufficient space to arrange the diplexers connected to these antenna modules.
2) Increase in Size—In order to form the shape of the narrow beam, a plurality of radiating elements or a plurality of antenna modules need to be arranged, and thus, the size of the antenna increases, resulting in decreased area efficiency.
3) Overlapping occurs between adjacent beams, and thus, the correlation between the polarizations of the beams is increased, resulting in deteriorated communication quality.

A new antenna device capable of solving all of the above problems of the conventional antenna device is presented herein.

Figure 8:
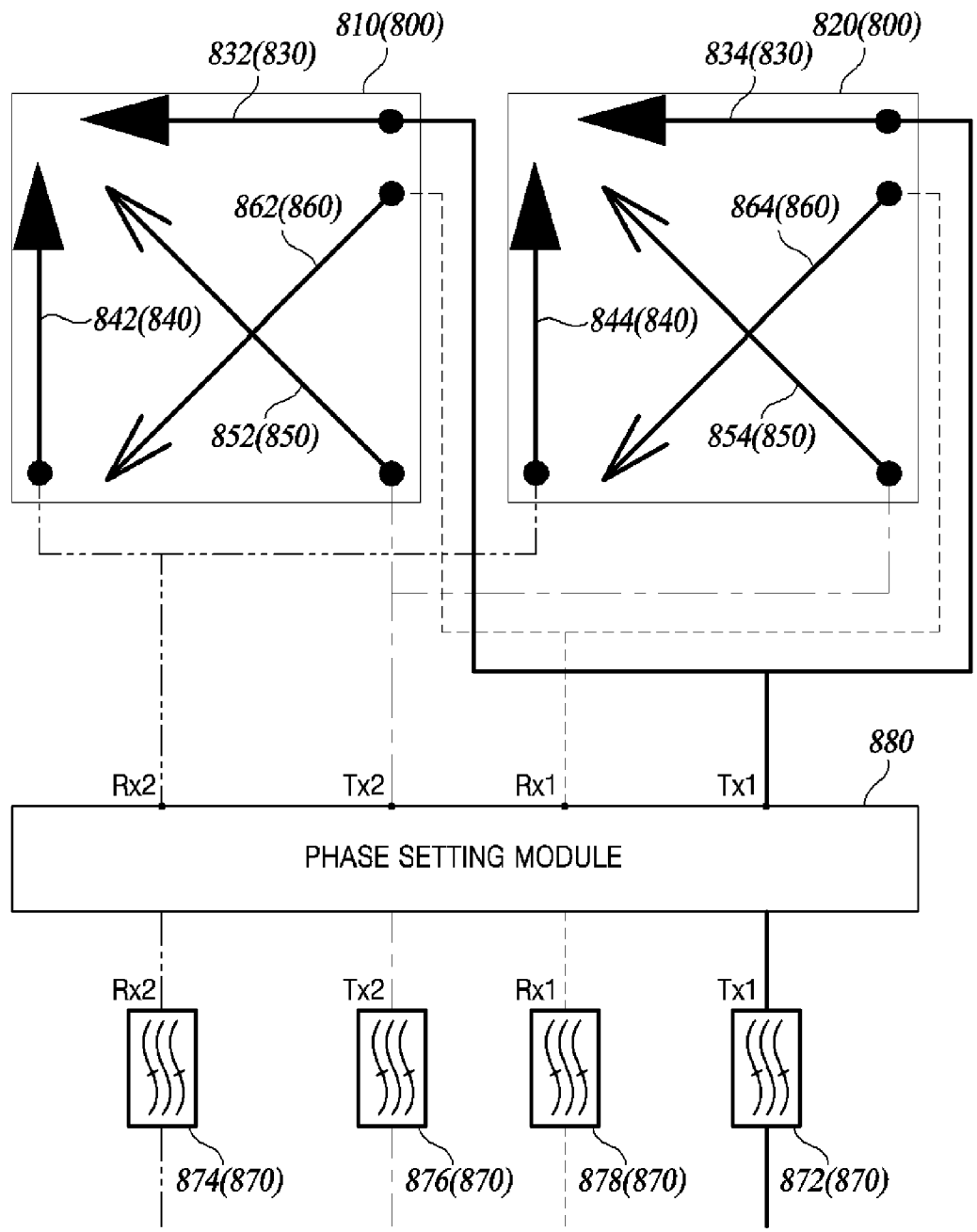
FIGS. 8, 9, 10 and 11 are diagrams for describing various examples of a quad-polarized antenna module array and a quad-polarized antenna device.

As illustrated in FIG. 8, the antenna device according to the present disclosure may be configured to include a quad-polarized antenna module array 800, a filter unit 870, and a phase setting module 880.

The quad-polarized antenna module array 800 has a configuration that radiates a plurality of beams using radiating elements included therein. The beams emitted through the quad-polarized antenna module array 800 may have the shape of a narrow beam, and two adjacent beams among these beams may have different polarization directions.

The quad-polarized antenna module array 800 may be configured to include a plurality of quad-polarized antenna modules. In this specification, it is assumed that the quad-polarized antenna module array 800 is configured to include two quad-polarized antenna modules. One of the two quad-polarized antenna modules is referred to as a first quad-polarized antenna module 810, and the other thereof is referred to as a second quad-polarized antenna module 820.

The first quad-polarized antenna module 810 and the second quad-polarized antenna module 820 may be arranged at the preset center-to-center distance (d; for example, 0.5λ) to secure the isolation between the modules 810 and 820 and to achieve the optimal conditions for the beamforming.

The first quad-polarized antenna module 810 may be configured to include first to fourth radiating elements 832, 842, 852, and 862.

The second radiating element 842 may have a polarization direction orthogonal to the first radiating element 832, the third radiating element 852 may have a difference in polarization direction of 45° with respect to the polarization direction of the first radiating element 832, and the fourth radiating element 862 may have a polarization direction orthogonal to the third radiating element 852. Since the third radiating element 852 and the fourth radiating element 862 have polarization directions orthogonal to each other, like the third radiating element 852, the fourth radiating element 862 may also have a difference in polarization direction of 45° with respect to the polarization direction of the first radiating element 832 and the second radiating element 842.

The second quad-polarized antenna module 820 may be configured to include fifth to eighth radiating elements 834, 844, 854, and 864.

The fifth radiating element 834 may have the same polarization direction as the first radiating element 832, the sixth radiating element 844 may have the same polarization direction as the second radiating element 842, the seventh radiating element 854 may have the same polarization direction as the third radiating element 852, and the eighth radiating element 864 may have the same polarization direction as the fourth radiating element 862.

Therefore, the sixth radiating element 844 may have a polarization direction orthogonal to the fifth radiating element 834, the seventh radiating element 854 may have a difference in polarization direction of 45° with respect to the polarization directions of the fifth radiating element 834 and the sixth radiating element 844, and the eighth radiating element 864 may have a polarization direction orthogonal to the seventh radiating element 854. Since the seventh radiating element 854 and the eighth radiating element 864 have polarization directions orthogonal to each other, like the seventh radiating element 854, the eighth radiating element 864 may also have a difference in polarization direction of 45° with respect to the polarization direction of the fifth radiating element 834 and the sixth radiating element 844.

Among the radiating elements included in the quad-polarized antenna module array 800, radiating elements having the same polarization direction may have signal paths coupled thereto. For example, the first radiating element 832 and the fifth radiating element 834 may have a first signal path Tx1 coupled thereto, and the second radiating element 842 and the sixth radiating element 844 may also have a second signal path Rx2 coupled thereto. In addition, the third radiating element 852 and the seventh radiating element 854 may have a third signal path Tx2 coupled thereto, and the fourth radiating element 862 and the eighth radiating element 864 may also have a fourth signal path Rx1 coupled thereto. Beams radiated through the radiating elements to which the signal path is coupled may have the shape of a narrow beam.

Here, the first radiating element 832 and the fifth radiating element 834 coupled through the first signal path Tx1 may be referred to as "first radiating elements or first radiating element pair 830", and the second radiating element 842 and the sixth radiating element 844 coupled through the signal path Rx2 may be referred to as "second radiating elements or second radiating element pair 840". In addition, the third radiating element 852 and the seventh radiating element 854 coupled through the third signal path Tx2 may be referred to as "third radiating elements or third radiating element pair 850", and the fourth radiating element 862 and the eighth radiating element 864 coupled through the fourth signal path Rx1 may be referred to as "fourth radiating elements or fourth radiating element pair 860."

Beams radiated through the radiating element may have a polarization direction (a polarization direction set in the radiating element from which beams are radiated) of the radiating element from which beams are radiated. For example, a beam radiated through the first radiating elements 830 may have a horizontal polarization direction, and a beam radiated through the second radiating elements 840 may have a vertical polarization direction. In addition, a beam radiated through the third radiating elements 850 may have a polarization direction of +45°, and a beam radiated through the fourth radiating elements 860 may have a polarization direction of −45°. Here, the beams having polarization directions of ±45° may be referred to as a first beam, and a beam having a vertical polarization direction and a beam having a horizontal polarization direction may be referred to as a second beam (V/H).

The filter unit 870 may filter signals moving through each of the signal paths Tx1, Tx2, Rx1, and Rx2 into a preset frequency band. The filter unit 870 may include a first filter 872, a second filter 874, a third filter 876, and a fourth filter 878. The detailed content for the filter unit 870 will be described below.

The phase setting module 880 may set phases between filtered signals to be different from each other so that beams radiated through the quad-polarized antenna module array 800 are separated in space. The phase setting module 880 may be implemented using a phase shifter or the like.

For example, the phase setting module 880 may set phases of signals moving through the first signal path Tx1 and the second signal path Rx2, and phases of signals moving through the third signal path Tx2 and the fourth signal path Rx1 to be different from each other. The signals moving through the first signal path Tx1 and the second signal path Rx2 are radiated as a first beam through the first radiating elements 830 and the second radiating elements 840, and the signals moving through the third signal path Tx2 and the fourth signal path Rx1 are radiated as a second beam through the third radiating elements 850 and the fourth radiating elements 860, and as a result, the first beam and the second beam may be radiated in different phases in space.

Since the beams are radiated in a state in which the beams radiated through the quad-polarized antenna module array 800 have the polarization direction of the radiating element from which the beams are radiated, two beams adjacent to each other in space may have different polarizations.

Embodiment 2-1: Securing Sufficient Space

Embodiment 2-1 is an embodiment of the structure or configuration of the filter unit 870 that may sufficiently secure or reserve a space for arrangement.

The filter unit 870 may include a first filter 872, a second filter 874, a third filter 876, and a fourth filter 878.

The first filter 872 may filter the signal moving through the first signal path Tx1 into the preset frequency band. The frequency band preset in the first filter 872 may be a frequency band of the signal radiated through the first radiating elements 830. The second filter 874 may filter the signal moving through the second signal path Rx2 into the preset frequency band. The frequency band preset in the second filter 874 may be a frequency band of the signals radiated through the second radiating elements 840.

The third filter 876 may filter the signal radiated through the third signal path Tx2 into the preset frequency band. The frequency band preset in the second filter 876 may be a frequency band of the signals radiated through the third radiating elements 850. The first filter 878 may filter the signal moving through the fourth signal path Tx1 into the preset frequency band. The frequency band preset in the second filter 878 may be a frequency band of the signals radiated through the fourth radiating elements 860.

As described above, the conventional antenna device is configured to include a diplexer connected to each of the signal paths, and separate the transmitted signal and the received signal through the diplexer, thereby implementing the FDD scheme. On the other hand, as illustrated in FIGS.

8 to 11, the antenna device of the present disclosure is configured to divide signal paths into a signal path used for signal transmission and a signal path used for signal reception, and include filters connected to each signal path, and filter the transmitted signal or the received signal through the filters, thereby implementing the FDD scheme.

Since the filter used in the antenna device of the present disclosure has a smaller size than the diplexer of the conventional antenna device, the antenna device of the present disclosure may secure a sufficient space for additionally arranging the filter. That is, in the antenna device of the present disclosure, a sufficient number of filters may be arranged without increasing the area in which the quad-polarized antenna module array 800 is arranged.

Embodiment 2-2: Improvement in Area Efficiency (Reduction in Antenna Size)

Embodiment 2-2 is an embodiment of an efficient arrangement structure of radiating elements capable of improving area efficiency by reducing the size of the quad-polarized antenna module array 800. As an efficient arrangement structure of the radiating elements, the arrangement structure of the quad-polarized antenna module described in the first embodiment may be applied.

For example, as illustrated in FIG. 8, the first radiating element 830 may be arranged on an upper side of the third radiating element 850 and the fourth radiating element 860, and the second radiating element 840 may be arranged on a right side or a left side of the third radiating element 850 and the fourth radiating element 860. As another example, the first radiating element 830 may be arranged on a lower side of the third radiating element 850 and the fourth radiating element 860, and the second radiating element 840 may be arranged on the right side or the left side of the third radiating element 850 and the fourth radiating element 860.

Figure 10:
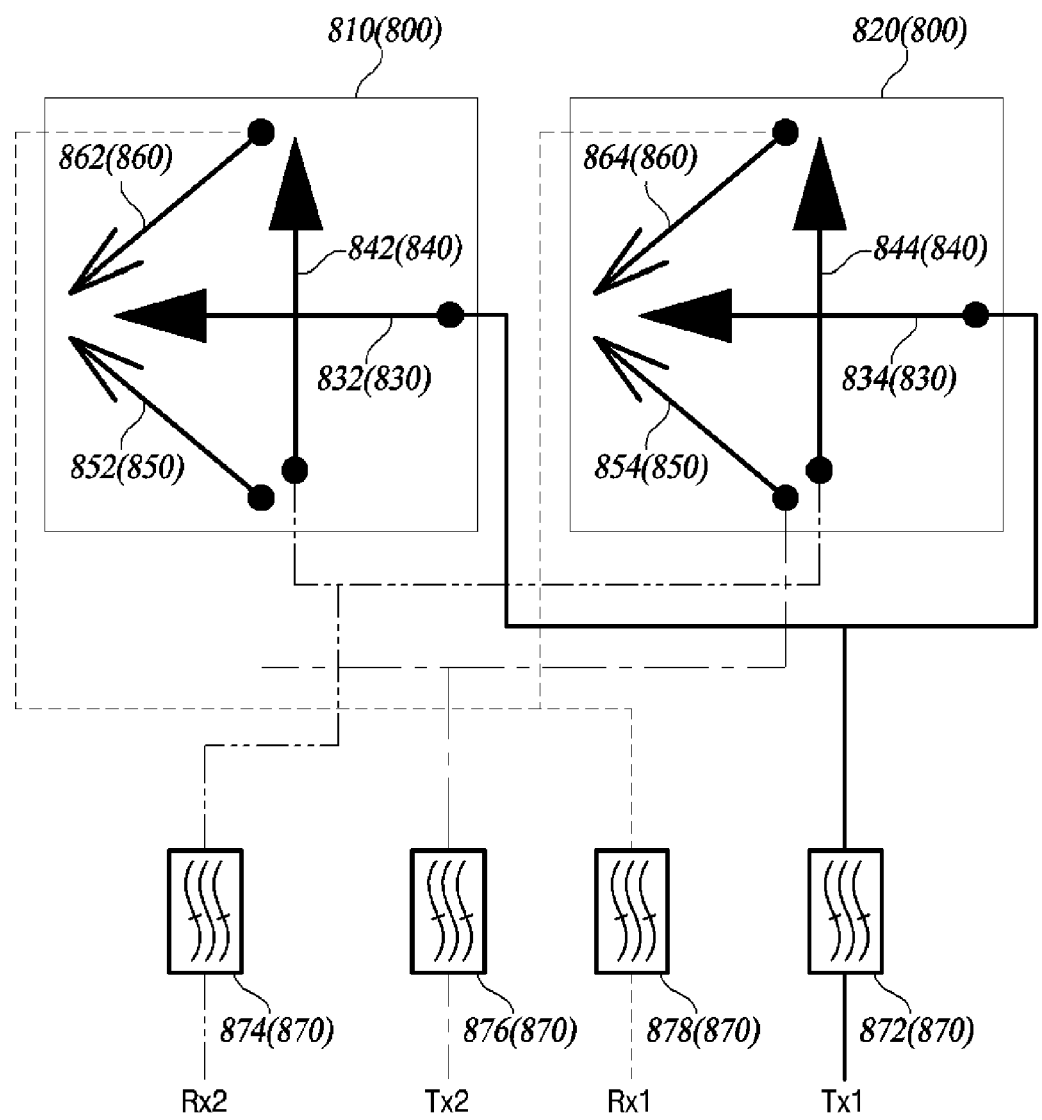

As another example, as illustrated in FIG. 10, the third radiating elements 850 may be arranged on a lower left side of the first radiating elements 830 and the second radiating elements 840, and the fourth radiating elements 860 may be arranged on an upper left side or a lower right side of the first radiating elements 830 and the second radiating elements 840. As another example, the third radiating elements 850 may be arranged on an upper right side of the first radiating elements 830 and the second radiating elements 840, and the fourth radiating elements 860 may be arranged on the upper left side or the lower right side of the first radiating elements 830 and the second radiating elements 840.

Figure 11:
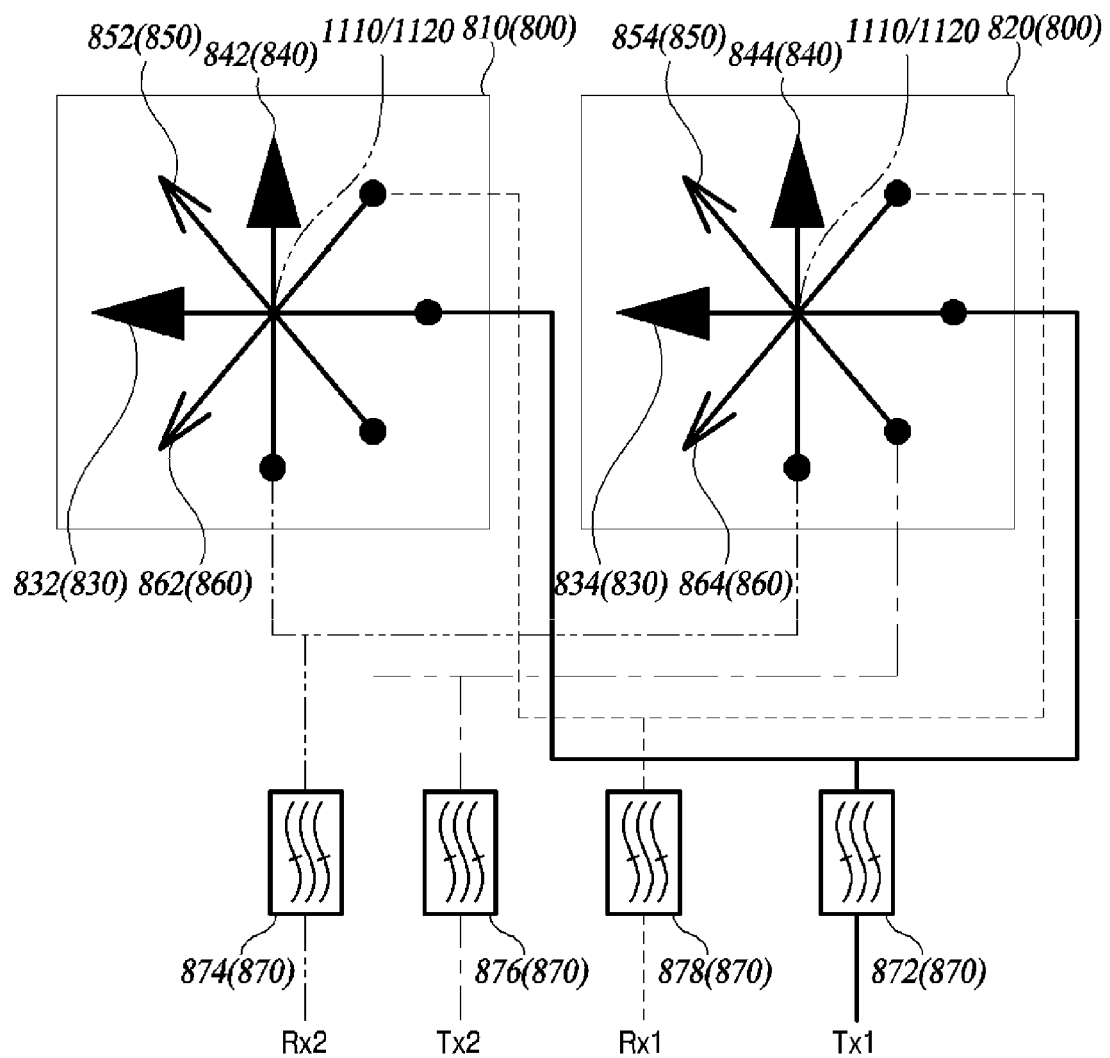

As another example, as illustrated in FIG. 11, each of the first radiating elements 830 may be arranged to intersect with each of the second radiating elements 840, and each of the third radiating elements 850 may be arranged to intersect with each of the fourth radiating elements 860. Here, a location or point at which the first radiating element 830 and the second radiating element 840 intersect with each other is referred to as a first intersection point 1110, and a location or point at which the third radiating element 850 and the fourth radiating element 860 intersect with each other may be referred to as a second intersection point 1120.

As in Embodiment 1-3, when a distance between the first intersection point 1110 and the second intersection point 1120 is minimized, the efficiency of the area occupied by the first and second quad-polarized antenna modules 810 and 820 may be maximized. Accordingly, in order to maximize the area efficiency, the first intersection point 1110 and the second intersection point 1120 may be arranged at the same location.

Meanwhile, the first quad-polarized antenna module 810 and the second quad-polarized antenna module 820 may be arranged in various layouts. For example, the quad-polarized antenna modules 810 and 820 may be arranged in a horizontal direction (transverse direction), a vertical direction (longitudinal direction), or a diagonal direction.

When the first and second quad-polarized antenna modules 810 and 820 are arranged in the horizontal direction, the first quad-polarized antenna module 810 may be arranged on the left side and the second quad-polarized antenna module 820 may be arranged on the right side, or the first quad-polarized antenna module 810 may be arranged on the right side and the second quad-polarized antenna module 820 may be arranged on the left side.

When the first and second quad-polarized antenna modules 810 and 820 are arranged in the vertical direction, the first quad-polarized antenna module 810 may be arranged on the upper side and the second quad-polarized antenna module 820 may be arranged on the lower side, or the first quad-polarized antenna module 810 may be arranged on the lower side and the second quad-polarized antenna module 820 may be arranged on the upper side. In this case, the radiating elements arranged in the vertical direction among the radiating elements 830, 840, 850, and 860 may be arranged at different locations, symmetrical locations, or opposite locations with respect to the vertical direction.

Figure 9:
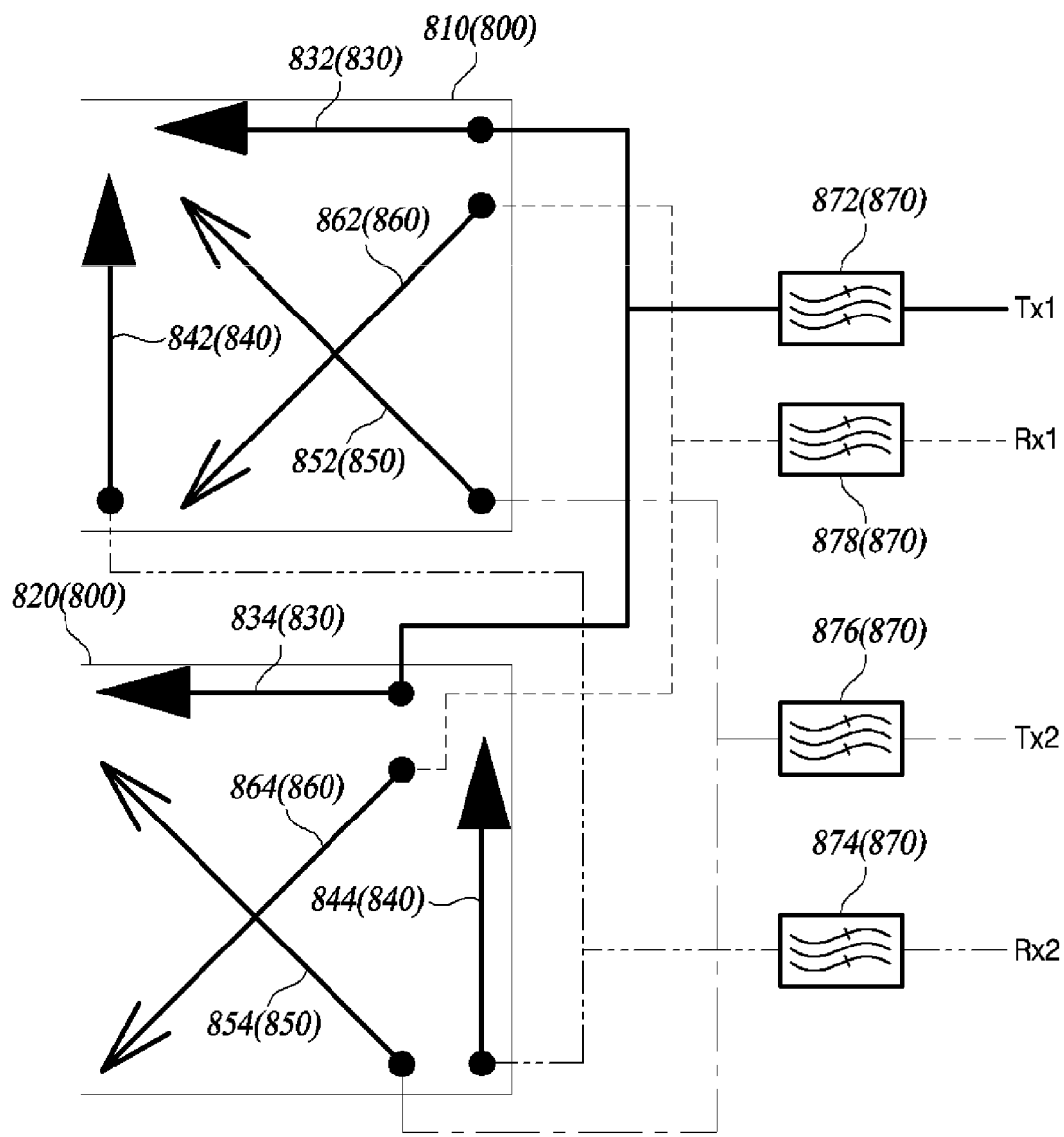

For example, as illustrated in FIG. 9, when the first quad-polarized antenna module 810 is arranged on the upper side and the second quad-polarized antenna module 820 is arranged on the lower side, among the second radiating elements 840, the second radiating element 842 included in the first quad-polarized antenna module 810 and the sixth radiating element 844 included in the second quad-polarized antenna module 820 are arranged in the vertical direction.

In this case, the second radiating element 842 and the sixth radiating element 844 may be arranged at different locations (opposite locations) with respect to the vertical direction. That is, the second radiating element 842 may be arranged on the left side of the third radiating element 852 and the fourth radiating element 862 and the sixth radiating element 844 may be arranged on the right side of the seventh radiating element 854 and the eighth radiating element 864 or the second radiating element 842 may be arranged on the right side of the third radiating element 852 and the fourth radiating element 862 and the sixth radiating element 844 may be arranged on the left side of the seventh radiating element 854 and the eighth radiating element 864.

The reason why the radiating elements arranged in the vertical direction are arranged at different locations with respect to the vertical direction is to form a narrow beam (a narrow beam having a preset radiation angle) having a sufficient gain.

The gain of the beam depends on the horizontal length of the radiating element, and the first radiating element 832 and the fifth radiating element 834 are arranged in the horizontal direction, so that a narrow beam having a sufficient gain by itself may be radiated. However, since the second radiating element 842 and the sixth radiating element 844 are arranged in the vertical direction, it may be difficult to radiate a narrow beam having a sufficient gain since the horizontal length is very short.

Therefore, by arranging the second radiating element 842 and the sixth radiating element 844 at locations symmetrical to each other, if the difference in distance between the second radiating element 842 and the sixth radiating element 844 is utilized as the horizontal length of the radiating element, a narrow beam having a sufficient gain may be formed.

Embodiment 2-3: Improvement in Correlation Between Beams (Spatial-Polarization Separation)

Embodiment 2-3 is a method of radiating beams separately in space (spatial separation) to improve a correlation between the beams, and differently setting polarizations between beams adjacent to each other among the beams separated in space (polarization separation).

The phase setting module 880 may set the phase or angle of the input signals so that the beams are separated from each other in space. For example, the phase setting module 880 may set a phase of a signal input to Tx1 and Rx2 and a phase of a signal input to Tx2 and Rx1 to be different from each other among input signals (filtered signals).

Signals set to different phases are radiated through the radiating elements 830, 840, 850, and 860. In this case, the signals set to different phases are to be radiated in the shape of a beam having a polarization direction set in respective radiating element 830, 840, 850, and 860.

For example, the signal input to Tx1 may be radiated as a beam having a horizontal polarization direction by the first radiating element 832 and the fifth radiating element 834, and the signal input to Rx2 may be radiated as a beam having a vertical polarization direction by the second radiating element 842 and the sixth radiating element 844 (second beam). In addition, the signal input to Tx2 may be radiated as a beam having a polarization direction of −45° by the third radiating element 852 and the seventh radiating element 854, and the signal input to the Rx2 may be radiated as a beam having a polarization direction of +45° by the fourth radiating element 862 and the eighth radiating element 864 (first beam).

Spatial-Polarization Separation in Horizontal Direction

Figure 13:
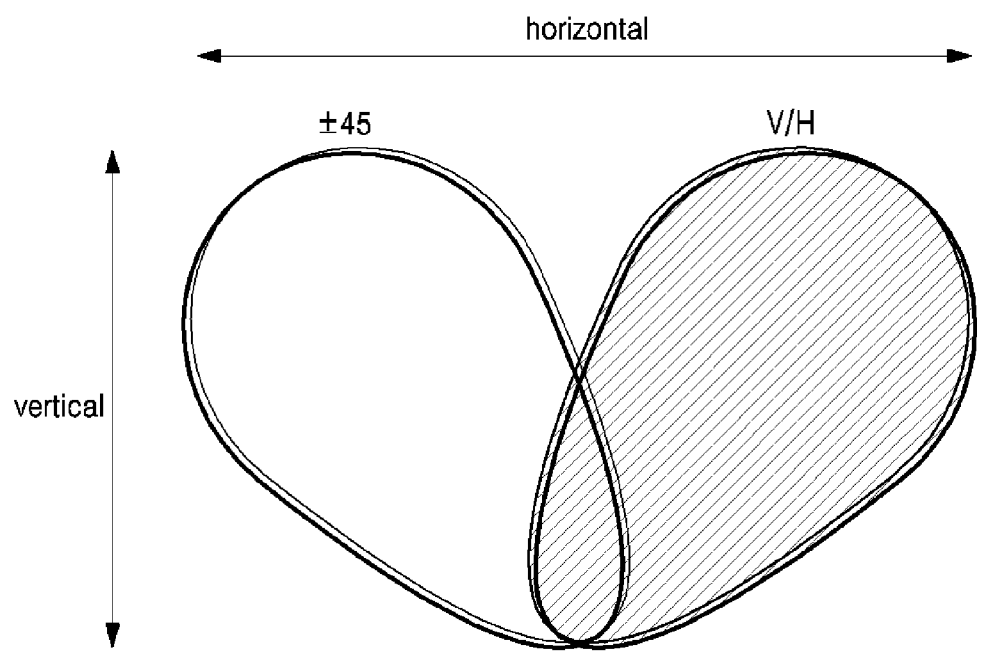
FIGS. 13, 14 and 15 are diagrams for describing spatial-polarization separation.

The phase setting module 880 may set the phases of the input signals to be different from each other in the horizontal direction. When the phases of the signals are set differently in the horizontal direction, the beams radiated through the quad-polarized antenna module array 800 may be spatially separated in the horizontal direction An example of the spatial-polarization separation of beams in the horizontal direction is illustrated in FIG. 13. A beam having a polarization direction of ±45° represents the first beam, and a beam having a polarization direction of V/H represents the second beam. Referring to FIG. 13, it can be seen that beams (the first beam and the second beam) having different polarizations or polarization directions are separated and radiated in a horizontal direction in space by the antenna device of the present disclosure.

Figure 14:
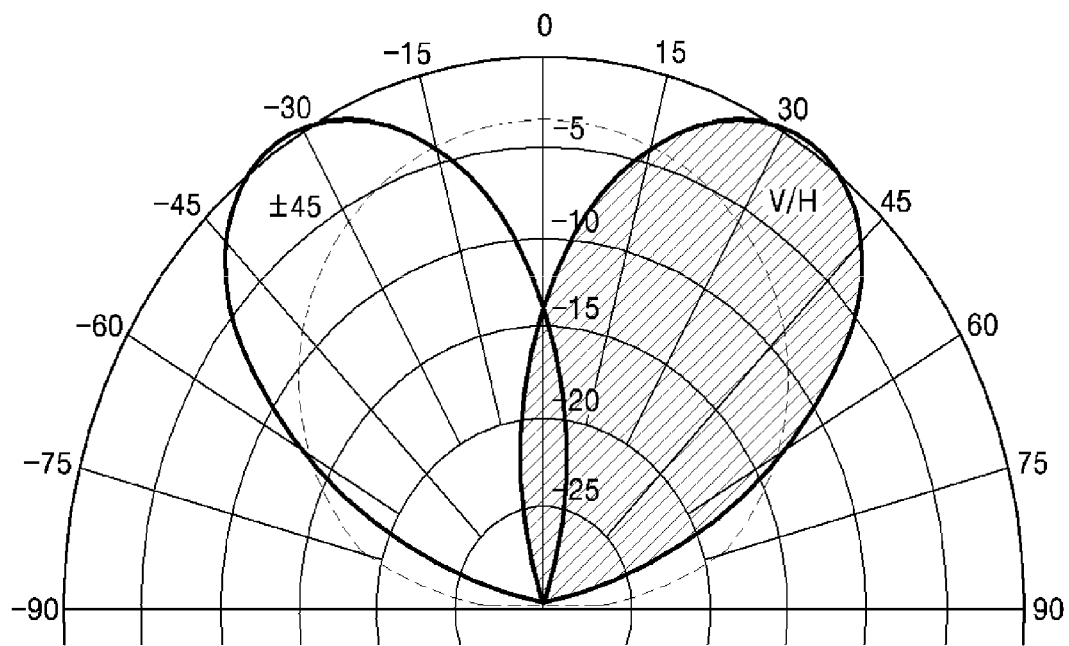

A comparison between the spatial-polarization separated beams by the antenna device of the present disclosure and the beams by the conventional antenna device is illustrated in FIG. 14.

In FIG. 14, a dotted line waveform represents the beam by the conventional antenna device, and a waveform not expressed as a pattern among waveforms indicated by a solid line represents the first beam)(±45° by the antenna device of the present disclosure, and a waveform expressed as a pattern represents the second beam (V/H) by the antenna device of the present disclosure.

It can be seen from FIG. 14 that, according to the antenna device of the present disclosure, the spatial-polarization separation of beams in the horizontal direction may be implemented, and more improved antenna gain may be derived compared to the conventional method. In addition, it may be seen that, according to the antenna device of the present disclosure, since sectors (spaces) are separated, an effect of increasing coverage may be provided.

Figure 15:
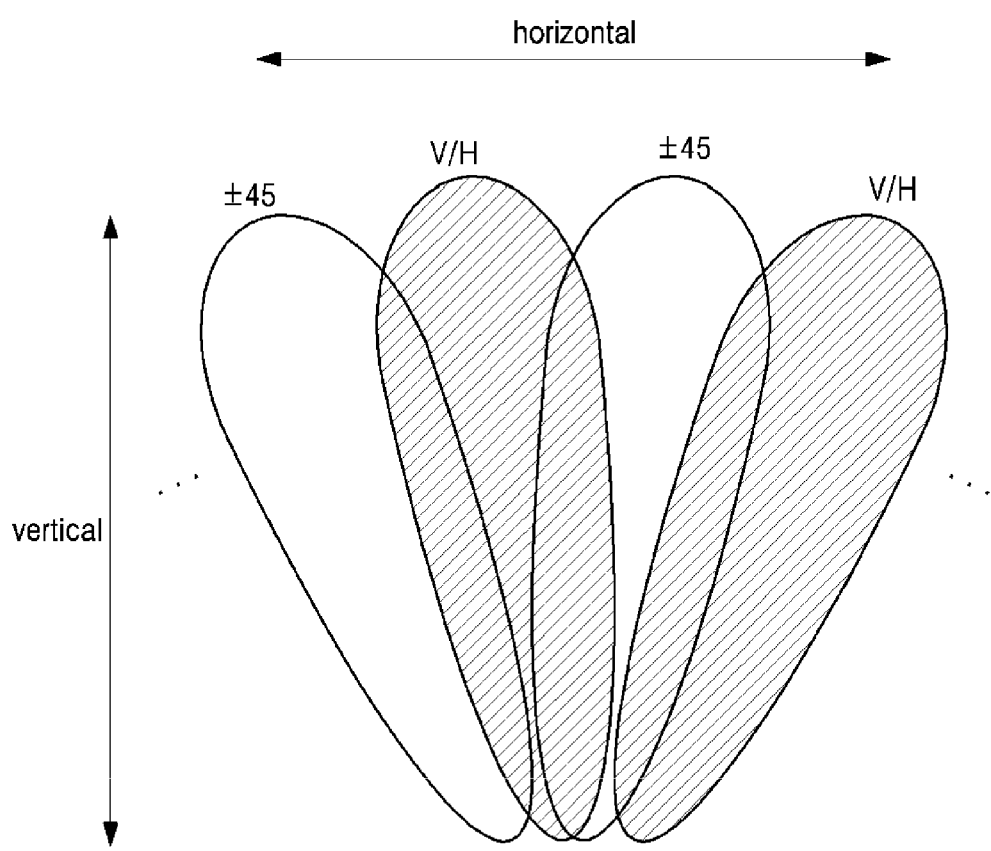

Furthermore, it can be seen that there is an overlapping region between beams radiated by the antenna device of the present disclosure, but since the polarizations between the beams are different (polarization separation), the correlation problem between the signals may be solved. A diagram describing the effect of the polarization separation in more detail is illustrated in FIG. 15.

With respect to the direction from left to right, since the first beam has a polarization direction of ±45° and the second beam has a polarization direction of V/H, the correlation between the two beams may be sufficiently small. This characteristic may also be established between the second and third beams and between the third and fourth beams.

Although the first and third beams both have a polarization direction of ±45°, since both the first and third beams are sufficiently far apart (spaced apart) from each other, the correlation between the two beams may be sufficiently small. This characteristic may also be established between the second and fourth beams.

As described above, since the antenna device of the present disclosure may configure different polarizations between narrow beams positioned adjacent to each other in space, it is possible to implement polarization reuse that may improve the correlation between the polarizations to completely reuse the polarization efficiency.

Third Embodiment

A third embodiment is a method of arranging a filter in a relatively narrow space by arranging antenna modules in different areas in an antenna module array to further reduce a filter size.

Figure 12:
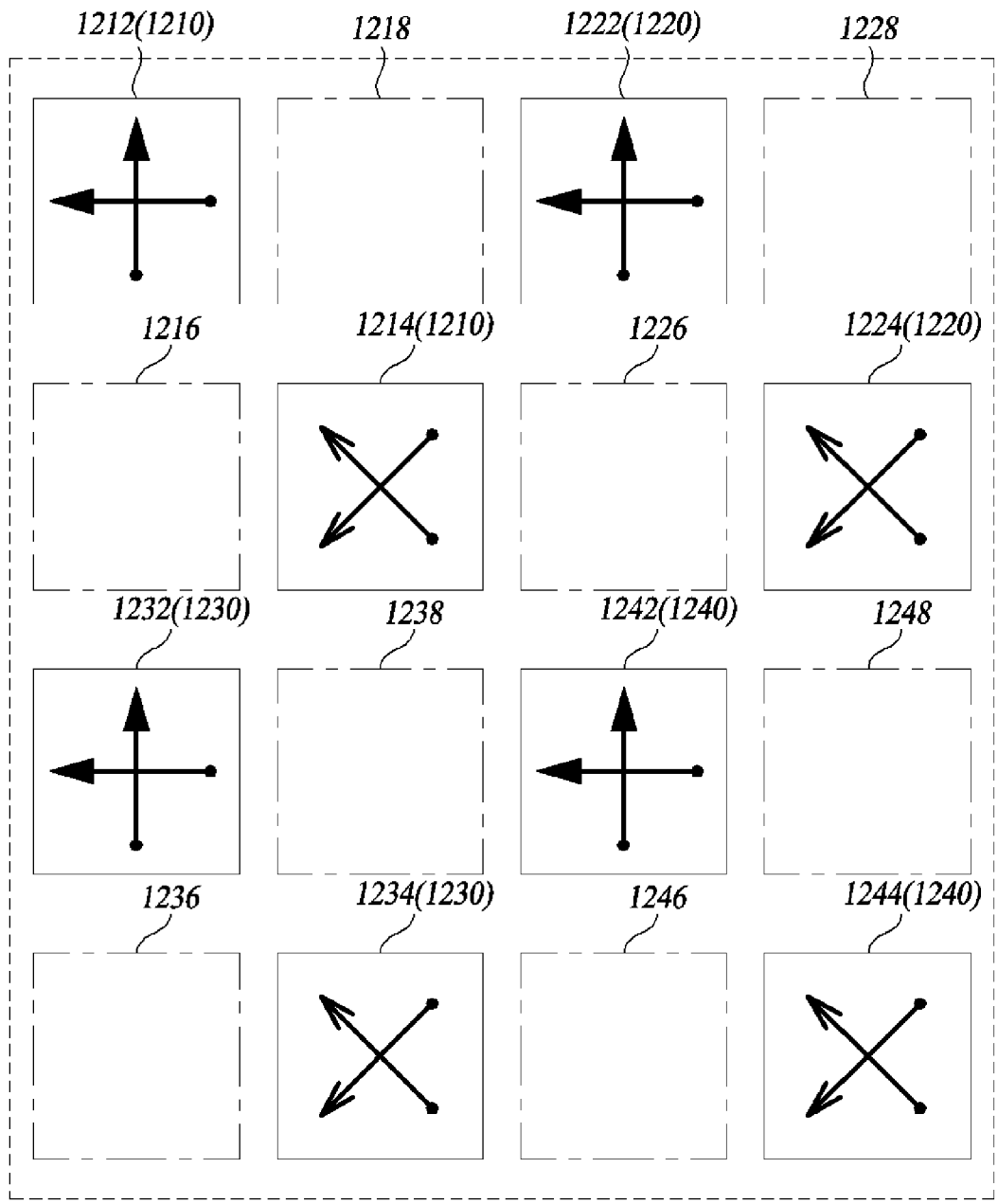
FIG. 12 is a diagram for describing another example of a quad-polarized antenna module array.

As illustrated in FIG. 12, the antenna module array is configured to include first radiating element modules 1212, 1222, 1232, and 1242 and second radiating element modules 1214, 1224, 1234, and 1244, each of which is corresponding to a dual-polarized antenna module. The first radiating element modules 1212, 1222, 1232, and 1242 may have a polarization direction of V/H or ±45°, and the second radiating element modules 1214, 1224, 1234, and 1244 may have a polarization direction of ±45° or V/H.

Each of the first radiating element modules 1212, 1222, 1232, and 1242 and the second radiating element modules 1214, 1224, 1234, and 1244 may be arranged at a preset center-to-center distance (d; for example, 0.54 The center-to-center distance d corresponds to a distance to secure the isolation between the first radiating element modules 1212, 1222, 1232, and 1242 and the second radiating element modules 1214, 1224, 1234, and 1244 and achieve optimal conditions for beamforming.

As illustrated in FIG. 12, the first radiating element modules 1212, 1222, 1232, and 1242 and the second radiating element modules 1214, 1224, 1234, and 1244 may be arranged to be interleaved with each other. Reference numerals 1216, 1218, 1226, 1228, 1236, 1238, 1246 and 1248 denote spaces or regions generated by allowing first radiating element modules 1212, 1222, 1232, and 1242 and second radiating element modules 1214, 1224, 1234, and 1244 to be interleaved with each other.

For example, since the first radiating element module 1212 and the second radiating element module 1214 are arranged in a diagonal direction, the first radiating element module 1222 and the second radiating element module 1224 are also arranged in a diagonal direction, the first radiating element module 1232 and the second radiating element module 1234 are also arranged in a diagonal direction, and the first radiating element module 1242 and the second radiating element module 1244 are also arranged in a diagonal direction, the first radiating element modules 1212, 1222, 1232, and 1242 and the second radiating element modules 1214, 1224, 1234, and 1244) may be arranged to be interleaved with each other.

In this way, when the first radiating element modules 1212, 1222, 1232, and 1242 and the second radiating element modules 1214, 1224, 1234, and 1244 are arranged to be interleaved with each other, a high degree of isolation can be ensured between the dual-polarized antenna of ±45° and the dual-polarized antenna of V/H. Securing a high degree of isolation may not only reduce the burden on the filter, but may also relatively reduce the size of the filter, and as a result, the filter may be arranged in a narrower space.

One quad-polarized antenna module may be configured by coupling any one of the first radiating element modules 1212, 1222, 1232, and 1242 with any one of the second radiating element modules 1214, 1224, 1234, and 1244. For example, one quad-polarized antenna module 1210 may be configured by coupling the radiating element modules 1212 and 1214, one quad-polarized antenna module 1220 may be configured by coupling the radiating element modules 1222 and 1224, one quad-polarized antenna module 1230 may be configured by coupling the radiating element modules 1232 and 1234, and one quad-polarized antenna module 1240 may be configured by coupling the radiating element modules 1242 and 1244.

In addition, the antenna device of the present disclosure may be configured so that the quad-polarized antenna modules 1210, 1220, 1230, and 1240 are coupled to radiate the narrow beam described in the second embodiment. Furthermore, the antenna device of the present disclosure may set the phases of the signals moving through the signal paths to be different from each other through the phase setting module 880. In this case, the spatial-polarization separation described with reference to FIGS. 13 to 15 may be implemented.

The spirit of the present embodiments is illustratively described hereinabove. It will be appreciated by those skilled in the art that various modifications and alterations may be made without departing from the essential characteristics of the present embodiments. Accordingly, exemplary embodiments disclosed in the present disclosure are not intended to limit the spirit of the present disclosure, but to describe the spirit of the present disclosure. The scope of the present embodiments is not limited to these exemplary embodiments. The scope of the present embodiments should be interpreted by the following claims, and it should be interpreted that all technical ideas equivalent to the following claims fall within the scope of the present embodiment.

DESCRIPTION OF REFERENCE SIGNS

800: Quad-polarized antenna module array
500, 1210, 1220, 1230, 1240: Quad-polarized antenna module
810: First quad-polarized antenna module
820: Second quad-polarized antenna module
510, 1212, 1222, 1232, 1242: First radiating element module
520, 1214, 1224, 1234, 1244: Second radiating element module
830: First radiating elements
840: Second radiating elements
850: Third radiating elements
860: Fourth radiating elements
512, 832: First radiating element
514, 842: Second radiating element
522, 852: Third radiating element
524, 862: Fourth radiating element
834: Fifth radiating element
844: Sixth radiating element
854: Seventh radiating element
864: Eighth radiating element
710, 1110: First intersection point
720, 1120: Second intersection point
870: Filter unit
872: First filter
874: Second filter
876: Third filter
878: Fourth filter
Tx1: First signal path
Rx2: Second signal path
Tx2: Third signal path
Rx1: Fourth signal path
1216, 1218, 1226, 1228, 1236, 1238, 1246, 1248: Spaces

What is claimed is:

1. A frequency division duplexing (FDD) type antenna device for implementing spatial-polarization separation of beams, the FDD type antenna device comprising:
   a quad-polarized antenna module array including first radiating elements that have the same polarization direction and share a first signal path, second radiating elements that have a polarization direction orthogonal to the first radiating elements and share a second signal path, third radiating elements that have a difference in polarization direction of 45° with respect to the second radiating elements and share a third signal path, and fourth radiating elements that have a polarization direction orthogonal to the third radiating elements and share a fourth signal path, wherein each of the first signal path and third signal path is configured to convey transmission signals and each of the second signal path and fourth signal path is configured to convey reception signals;
   a filter unit including a first filter that filters a signal of the first signal path, a second filter that filters a signal of the second signal path, a third filter that filters a signal of the third signal path, and a fourth filter that filters a signal of the fourth signal path, wherein the filter unit comprises a transmission filter part including the first filter and the third filter, and a reception filter part including the second filter and the fourth filter; and
   a phase setting module configured to set phases of the filtered signals such that a first beam radiated through the first radiating elements and the second radiating elements and a second beam radiated through the third radiating elements and the fourth radiating elements are separated from each other in space,
   wherein the first beam and the second beam have different polarization directions.

2. The antenna device of claim 1, wherein the phase setting module sets the phases of the filtered signals in a horizontal direction such that the first beam and the second beam are separated from each other in the horizontal direction in the space.

3. The antenna device of claim 1, wherein the first radiating elements are arranged on an upper side or a lower side of the third radiating elements and the fourth radiating elements, and the second radiating elements are arranged on a right side or a left side of the third radiating elements and the fourth radiating elements.

4. The antenna device of claim 3, wherein the quad-polarized antenna module array includes:

a first quad-polarized antenna module including any one of the first radiating elements, any one of the second radiating elements, any one of the third radiating elements, and any one of the fourth radiating elements; and a second quad-polarized antenna module including the other of the first radiating elements, the other of the second radiating elements, the other of the third radiating elements, and the other of the fourth radiating elements, and arranged on an upper side or a lower side of the first quad-polarized antenna module, and the second radiating element included in the second quad-polarized antenna module is arranged in a location opposite to a location where the second radiating element included in the first quad-polarized antenna module is arranged in the first quad-polarized antenna module.

5. The antenna device of claim 1, wherein the third radiating elements are arranged on a lower left side or an upper right side of the first radiating elements and the second radiating elements, and the fourth radiating elements are arranged on a lower right side or an upper left side of the first radiating elements and the second radiating elements.

6. The antenna device of claim 1, wherein each of the first radiating elements are arranged to intersect with each of the second radiating elements at a first intersection point, and each of the third radiating elements are arranged to intersect with each of the fourth radiating elements at a second intersection point.

7. The antenna device of claim 6, wherein the first intersection point and the second intersection point are arranged at the same location.

\* \* \* \* \*